Figure 4:
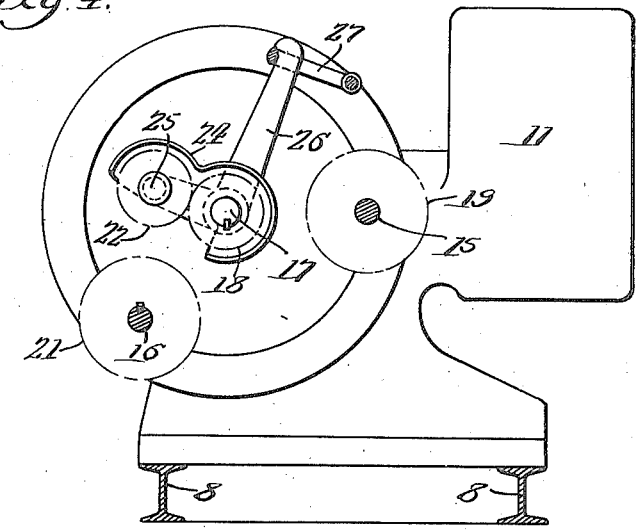

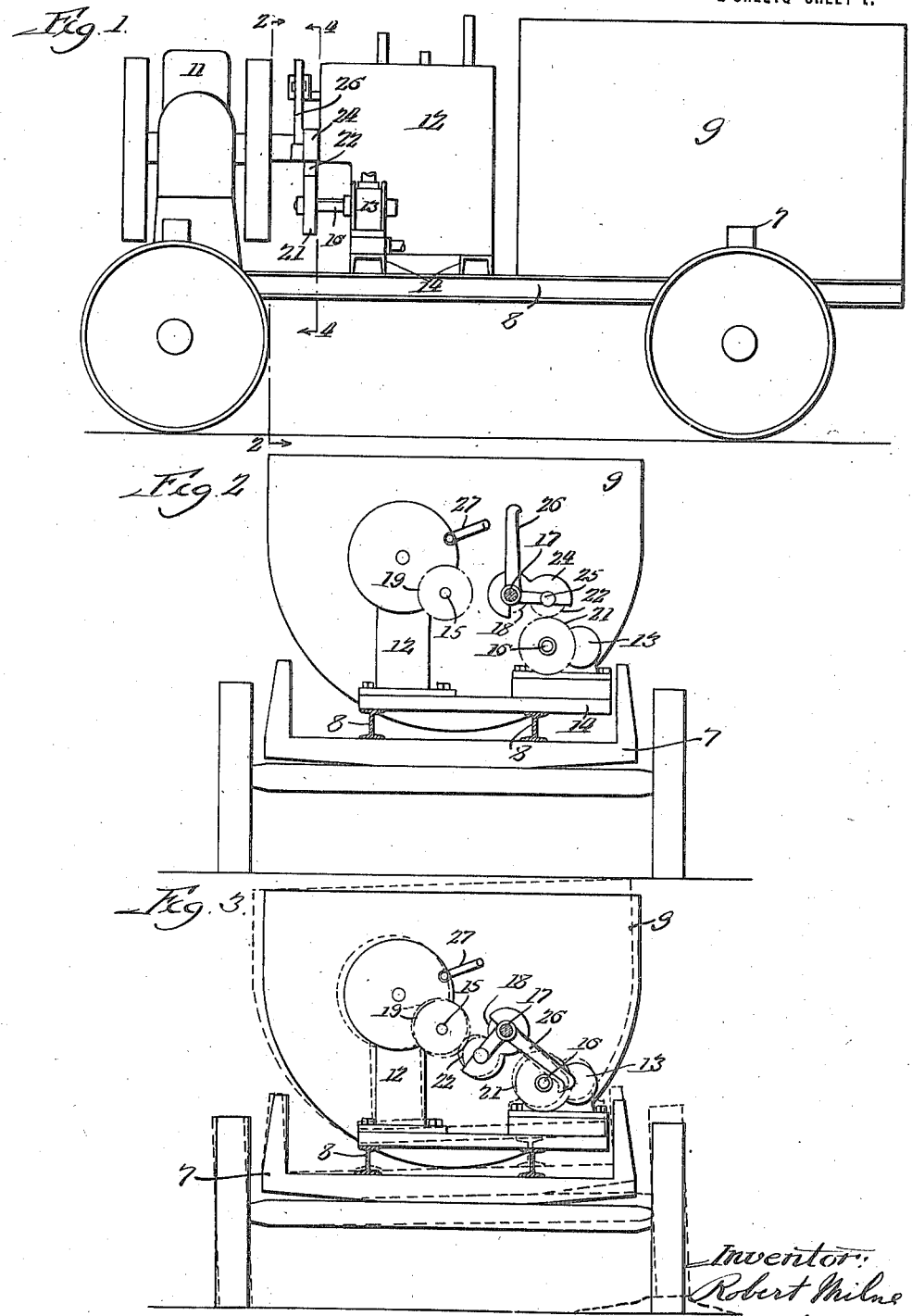

R. MILNE.
DRIVE GEARING FOR PUMP OUTFITS.
APPLICATION FILED NOV. 27, 1917.

1,267,889.

Patented May 28, 1918.
2 SHEETS—SHEET 2.

Inventor:
Robert Milne
By Pond & Wilson
Attys.

UNITED STATES PATENT OFFICE.

ROBERT MILNE, OF ROCKFORD, ILLINOIS, ASSIGNOR TO WARD PUMP COMPANY, OF ROCKFORD, ILLINOIS, A CORPORATION OF ILLINOIS.

DRIVE-GEARING FOR PUMP OUTFITS.

1,267,889.

Specification of Letters Patent.  Patented May 28, 1918.

Application filed November 27, 1917. Serial No. 204,175.

*To all whom it may concern:*

Be it known that I, ROBERT MILNE, a citizen of the United States, residing at Rockford, in the county of Winnebago and State of Illinois, have invented certain new and useful Improvements in Drive-Gearing for Pump Outfits, of which the following is a specification.

This invention relates in general to gearing by means of which driving power is transmitted from a driving member to either one of two driven shafts through the agency of a quick change device, and has more particular reference to the application of such drive mechanism to a number of pump units, such for instance, as are found in a spray outfit.

Spray outfits generally comprise a multi-cylinder spray pump, a pump for filling a supply tank, and a source of motive power, such for instance as a gas engine, for driving the pumps. When an outfit of this character is mounted on a truck for various spraying purposes, it is desirable to secure a supporting frame structure on the truck as light in weight as possible in order to lessen the draft. The truck and its load, it will be noted, are comparatively heavy, because of the weight of the engine and pumps and other mechanism and of the large supply tank when filled. In such an outfit, considerable difficulty has been experienced in providing suitable driving connections between the engine and pump units, because, due to the necessarily light supporting structure, considerable flexing of the frame results when passing over uneven ground, thereby causing relative displacement of the driving and driven members. Consequently, special provision must be made in the driving mechanism to remedy this condition. So far as I am aware, the driving mechanisms heretofore provided have been unsatisfactory, not only because of their complexity but because of their incapability of permitting a most efficient drive and enabling desired changes in transmitting the drive.

The primary object, therefore, of my present invention is to overcome the objections heretofore experienced in driving mechanism for a number of pump units, and I have especially aimed to provide a simple and novel quick-change drive mechanism for the pump units of a spray outfit. It should, however, be understood that the invention contemplates the adaptability of my improved drive mechanism for other purposes within the spirit and scope of the claims appended hereto.

My object includes the provision of a simple gear drive mechanism by means of which the driving power may be transmitted from a driving member to either one of two driven members at will, or may be disconnected entirely from such driven members and employed for other purposes.

In furtherance of these general objects, I have provided a simple system of gearing, one practical embodiment of which is fully described in the following specification and illustrated in the accompanying drawings, in which—

Figure 5:
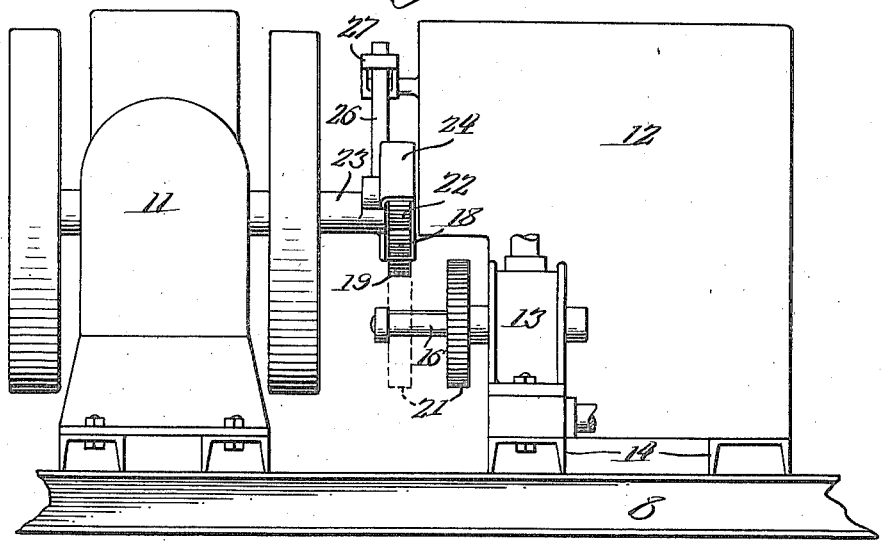

Figure 1 is a side elevation of a spray outfit illustrated quite briefly, embodying my improvements;

Fig. 2, a cross-sectional view taken substantially on the line 2—2 of Fig. 1, showing the engine drive connected to the supply pump;

Fig. 3, a view similar to Fig. 2, but showing the engine drive connected to the spray pump, and also illustrating the manner in which the latter is displaced relatively to the engine by flexing of the frame;

Fig. 4, an enlarged view of the drive mechanism in neutral position, taken substantially on the line 4—4 of Fig. 1; and Fig. 5, a side elevation of the drive taken in the position shown in Fig. 4.

Since I have taken as an example the application of my improvements to a spray outfit, I will first mention briefly the parts thereof illustrated in the drawings. A suitable wheeled truck designated generally by reference character 7, carries a supporting structure or frame, in this instance, consisting of a pair of longitudinally arranged sills in the form of I-beams 8. Upon the front end of the supporting structure is mounted a large supply tank 9 and upon the other end of the supporting structure is mounted a gas engine 11 arranged with its drive shaft extending in a fore-and-aft direction, that is, parallel with the longitudinal axis of the truck. Intermediate the engine and tank is mounted on the supporting structure a multi-cylinder spray pump and a rotary supply pump 12 and 13 respectively, each illustrated but briefly, since they may be of any suitable construction, and in the present instance are mounted directly on transverse channel bars 14 in turn secured to the beams 8. These pumps, it will be noted, are arranged so that the driving elements 15 and 16 thereof, adapted to be driven by a driving shaft 17 of the engine are disposed in parallel relation to said driving shaft and spaced laterally on opposite sides thereof, as shown in Fig. 2, the driven element 15 being positioned in this instance, in substantially the horizontal plane of the driving shaft and the driven element 16 being positioned considerably below such plane.

It will be noted that by reason of this arrangement the driving and driven elements mentioned intersect a common vertical plane, and I have provided a simple system of gearing in this plane adapted for transmitting the drive from the engine shaft to either of the driven elements, at will, or for disconnecting the drive so that the power of the engine may be utilized for other purposes. This consists of a driving spur gear 18 fixed to the engine shaft, a driven gear 19 fixed to the driven element or shaft 15 in the transverse plane of the driving gear, a driven gear 21 splined on the driven shaft 16 so as to be movable into and out of said transverse plane, and a shiftable gear 22 always in mesh with the driving gear 18 and adapted to be moved into and out of mesh with either of the gears 19 and 21 or to be held in a neutral position. The means for holding the shiftable gear 22 in mesh with the driving gear and for shifting the former gear, consists of a bell crank structure in the form of a casting suitably shaped so as to have a substantial bearing 23 on the driving shaft 17 rearward of the gear 18, a housing 24 for the gears 18 and 22, upon the free end of which housing is secured a stub shaft 25 on which the gear 22 is revolubly mounted, and a shifter arm 26 by means of which an operator may easily adjust or shift the gear 22 to its several positions. As shown in Fig. 4, the upstanding arm 26 of the gear shifter is engaged by a pivoted keeper 27, which holds the shiftable gear in a neutral position in which both pumps remain idle and the power of the engine may be employed for other purposes. When it is desired to operate the pump 13, the operator raises the keeper 27 to free the gear shifter and swings the latter in a direction to lower the gear 22 into mesh with the supply pump gear 21, as shown in Fig. 2, which latter gear, it will be obvious, will have been previously moved forwardly on the shaft 16 into the path of the gear 22 by the operator. Viewing Fig. 2, it will be noted that since the driving shaft revolves in a clockwise direction, the driven shaft 16 will be correspondingly revolved and the intermediate or shiftable gear 22 will revolve in the reverse direction, and consequently, will constantly urge itself into mesh with the gear 21. This tendency of the gear 22 to maintain the driving connection is augmented by arranging the parts so that the center of the gear 22, when in this position, is disposed slightly below a horizontal plane passing through the center of the driving shaft. When now it is desired to drive the spray pump 12, the operator withdraws the gear 22 from mesh with the supply pump gear 21 by operating the lever arm 26, slides the gear 21 forwardly on the shaft 16 out of the path of the gear 22, then swings the shifter 26 in a clockwise direction until the gear 22 meshes with the gear 19, as shown in Fig. 3. This change, or any change, may be made while the engine is in operation. It will be noted, viewing Fig. 3, that not only does the weight of the shifter arm 26 hold the gear 22 in mesh with the gear 19, but due to the arrangement of parts, the gear 22 will have a tendency to hold itself permanently and forcibly into mesh with the gear 19. Thus, no auxiliary device or means of any kind is necessary to maintain the driving connection after the same is established between either the supply or spray pump, and the driving connection may be instantly broken at will by simply operating the shifter arm 26 to withdraw the gear 22 from whichever gear it is in mesh with. It will be further noted that in either driving position the gear 22 will remain fully in mesh with its respective gear at all times regardless of any relative movement between the centers of the driven shafts and driving shaft which might be caused by flexing of the supporting structure when the truck passes over uneven ground or obstructions. Such an example is illustrated in Fig. 3, in which the forward end of the truck has been tilted, thereby flexing the supporting frame structure so as to move the engine shaft laterally relatively to the spray pump shaft. The driving connection, however, between the spray pump and driving shaft is in no way affected by such displacement, since as mentioned, the shiftable gear 22 is free to follow any displacement of the driven gear 19, and moreover, is forcibly held in engagement with said driven gear by reason of the arrangement of the gears and the direction of the drive.

From the foregoing, it will be manifest that a very simple drive mechanism is provided by means of which an operator may establish at will a driving connection between a driving shaft and either one of two driven shafts, and that the driving connection thus established will be maintained regardless of relative displacement of the shafts incidental to conditions of usage. In the particular application, either pump unit may be operated at one time so that when one pump is in operation the other remains idle and, therefore, is not working needlessly and causing undue wear, and when it is not desired to operate either pump, the shifting device may be set in neutral position and the engine may be utilized for other purposes.

It is believed that the foregoing conveys a clear understanding of the objects prefaced above, and it should be understood that while I have illustrated one working embodiment of my improvements, various changes in the construction and arrangement may be made without departing from the spirit and scope of the invention as expressed in the appended claims.

I claim:

1. In a pump outfit of the character described, the combination with a supporting structure upon which is mounted two pump units and an engine arranged with the driving shaft of the engine intermediate and in parallel relation with the pump shafts, of a gear on each of the pump shafts and the engine shaft, an intermediate gear always in mesh with the engine, and means holding said intermediate gear always in mesh with the engine shaft gear and operable to swing said intermediate gear into and out of mesh with either of the pump gears.

2. In a spray outfit of the character described, the combination with a truck upon the supporting structure of which is mounted an engine, a spray pump and a supply pump, with the driving shafts thereof extending lengthwise of the truck in spaced parallel relation, the arrangement being such that due to flexing of the supporting structure from the weight of the load when the truck is moved over uneven ground, obstructions, etc., the driving shaft of the engine and one of the pumps are relatively moved in a lateral direction thereby varying the distance between centers of such shafts, of means for establishing a driving connection between the engine shaft and either of said pump shafts at will through the agency of gearing including an intermediate gear arranged so as to be constantly urged into mesh with its companion gear when in operation to accommodate any variation in relative distances between shaft centers caused by flexing of the supporting structure as mentioned.

3. In a spray outfit of the character described, the combination with a truck upon the supporting structure of which is mounted an engine, a spray pump and a supply pump, with the driving shafts thereof extending lengthwise of the truck in spaced parallel relation, the arrangement being such that due to flexing of the supporting structure from the weight of the load when the truck is moved over uneven ground, obstructions, etc., the driving shaft of the engine and one of the pumps are relatively moved in a lateral direction thereby varying the distance between centers of such shafts, a gear on each pump shaft and on the engine shaft, an intermediate gear always in mesh with the engine shaft and movable into and out of mesh with either one of the gears on the pump shafts at will, the parts being so arranged that the intermediate gear will be constantly urged into driving connection with whichever pump shaft gear it is engaged, so that the driving connection will not be disturbed by variations between centers of the shaft caused by flexing of the supporting structure.

4. In a pump outfit, the combination with a supporting structure having mounted thereon an engine and two pump units, the driving shafts of which are in parallel relation spaced laterally of the truck with the engine shaft intermediate the pump shafts, of a gear on the engine shaft and on each of the pump shafts, an intermediate gear held always in mesh with the gear on the engine shaft and being movable about the axis thereof to different operative positions, the intermediate gear being adapted to rest on the top of one of the pump gears in mesh therewith and being movable into mesh with the other pump gear at the underside thereof, for driving the respective pumps.

5. In a pump outfit, the combination of a driving and a driven shaft arranged in laterally spaced relation, means supporting the shafts and subject in usage to relative lateral displacement, a gear on each shaft, an intermediate gear, and means holding the intermediate gear always in mesh with one of the gears and allowing the intermediate gear to be swung about the axis of the engaged gear into and out of mesh with the other gear, the intermediate gear being constantly urged during operation into mesh with the engageable gear so that the driving connection will be maintained irrespective of lateral variation between the shafts.

6. In a pump outfit, the combination of a driving and a driven gear spaced laterally and connected respectively with separate mechanisms, a supporting structure therefor, the construction being such that the gears are subject to relative lateral vibrations, an intermediate gear, and means holding the intermediate gear always in mesh with one of the gears and allowing it to be moved freely into and out of mesh with the other gear, the arrangement being such that due to the direction of drive and the capacity of the intermediate gear for free bodily movement the latter gear will be constantly urged into mesh with the engageable gear, whereby the driving connection will be maintained irrespective of relative lateral variation between the gears.

7. In a pump outfit, the combination of a driving shaft and two pump shafts adapted to be driven thereby, said shafts being arranged in laterally spaced parallel relation with the driving shaft intermediate the pump shafts, a gear on each of said shafts, an intermediate gear, and means holding the intermediate gear always in mesh with the gear on the driving shaft, said intermediate gear being adapted to mesh with one of the shaft gears, which latter gear is movable out of the path of the intermediate gear so that the same may be swung about the driving shaft into mesh with the other pump shaft gear, the arrangement being such that due to the continuous rotation of the driving shaft in one direction the intermediate gear will be urged into driving connection with the respective driven gears when moved into mesh therewith.

ROBERT MILNE.